United States Patent
Korobov et al.

(10) Patent No.: US 11,650,832 B1
(45) Date of Patent: May 16, 2023

(54) SYSTEM AND METHOD FOR DRAWING OPTIMIZATION WITH POINTER INPUT IN A REMOTE SESSION

(71) Applicant: PARALLELS INTERNATIONAL GmbH, Schaffhausen (CH)

(72) Inventors: Ivan Korobov, Moscow (RU); Dmitry Varentsov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 23 days.

(21) Appl. No.: 17/335,664

(22) Filed: Jun. 1, 2021

Related U.S. Application Data (63) Continuation of application No. 16/441,979, filed on Jun. 14, 2019, now Pat. No. 11,093,264.

(51) Int. Cl.
*G06T 11/20* (2006.01)
*G06F 9/451* (2018.01)
*G06F 3/0354* (2013.01)

(52) U.S. Cl.
CPC ............ *G06F 9/452* (2018.02); *G06T 11/203* (2013.01); *G06F 3/03543* (2013.01); *G06T 2200/24* (2013.01)

(58) Field of Classification Search
CPC .... G06F 9/452; G06F 3/03543; G06T 11/203; G06T 2200/24
USPC .......................................................... 345/442
See application file for complete search history.

(56) References Cited

U.S. PATENT DOCUMENTS

| | | | | |
|---|---|---|---|---|
| 5,673,403 A | * | 9/1997 | Brown | G06F 9/452 715/788 |
| 6,628,285 B1 | * | 9/2003 | Abeyta | G06F 3/0481 715/255 |
| 7,483,030 B2 | | 1/2009 | Kass et al. | |
| 2006/0192783 A1 | * | 8/2006 | Kass | G06T 13/80 345/473 |
| 2009/0235082 A1 | * | 9/2009 | Garrett | H04L 9/3231 713/176 |
| 2011/0109625 A1 | | 5/2011 | Yamada | |
| 2014/0160125 A1 | | 6/2014 | Yoo et al. | |
| 2019/0243520 A1 | * | 8/2019 | Cao | G06F 3/04883 |

\* cited by examiner

*Primary Examiner* — Hai Tao Sun
(74) *Attorney, Agent, or Firm* — Rosenberg, Klein & Lee (57) ABSTRACT

Systems and methods for managing user input for a remote application session between a client device and a remote server are provided. Input command data is received from a client device for an application executing within a remote session established between the client device and the remote server. The input command data specifies a plurality of points within a graphical user interface where the input command data was captured on the client device. Spline curves are calculated based on a first subset of sequential points from the plurality of points. Simulated input events are generated that specify intermediate points calculated along the spline curves. The simulated input events are injected into the remote server for the application.

12 Claims, 6 Drawing Sheets

SYSTEM AND METHOD FOR DRAWING OPTIMIZATION WITH POINTER INPUT IN A REMOTE SESSION

CROSS-REFERENCE TO RELATED APPLICATIONS

This application claims the benefit of priority as a continuation application of U.S. Ser. No. 16/441,979 filed Jun. 14, 2019, the entire contents of which are incorporated herein by reference.

FIELD OF TECHNOLOGY

The present disclosure relates generally to the field of remote computing, more specifically, to systems and methods of enhancing user experience during drawing operations in remote applications.

BACKGROUND

Remote desktop technologies (also referred to as "remote access") allow a local user interacting with a local computing device to control and view a remote desktop session originating from a remote computer or host. A remote desktop client application running on the client computer and a remote desktop server application running on the server computer together facilitate "remoting" a desktop session. The remote desktop client application receives user input, such as keyboard and mouse input, and converts the input into a network-compatible representation to be transmitted to the server computer. The remote desktop server application running on the server computer receives the network-compatible representation of the user input, and converts this representation into actual input messages. The input messages are then sent to the server computer's message queue and processed as if the input was generated at the server computer. Therefore, applications running on the server computer respond to the input as if the input was generated at the server computer.

When a user works with a remote application or remote desktop from a mobile client or desktop application, it has been determined that the farther the remote application behavior is to the local native application, the worse the user experience shall be. The majority of applications support interaction via touch or mouse input, so remote client applications should provide an ability to interact with remote applications via touch gestures (either by sending touch events to the remote server or by emulating mouse pointer events from the touch events), or via a local mouse pointing device (sending mouse move, click, drag, scroll, and other events to the remote server. Network latency or other delays can cause inaccuracies in the remote application's visual response to these events, thereby causing the user experience to suffer. This problem is particularly acute in drawing use cases, where the user attempts to draw something in the remote application such as for an e-signature or drawing canvas. Deviations of the line being drawn from the mouse pointer or input object (e.g., finger, stylus) cause a poor user experience.

SUMMARY

Thus, a system and method is disclosed herein for managing user input for a remote application session between a client device and a remote server, and, more particularly, for optimizing drawing operations via user input for a remote application session between a client device and a remote server.

According to an exemplary aspect, a method for managing user input for a remote application session between a client device and a remote server is provided. The method includes receiving, from a client device, input command data for an application executing within a remote session established between the client device and the remote server. The input command data specifies a plurality of points within a graphical user interface where the input command data was captured on the client device. The method further includes calculating a first spline curve based on a first subset of sequential points from the plurality of points, generating a plurality of simulated input events specifying a plurality of intermediate points calculated along the first spline curve, and injecting the plurality of simulated input events into the remote server for the application.

In another aspect, the first spline curve is a quadratic Bezier curve generated based on the first subset of points comprised of a start point, a control point, and an end point, wherein the control point defines a curvature of the spline curve.

In another aspect, the method further includes generating the first spline curve based on a first sequential subset of the points and a second spline curve based on a second sequential subset of the points, and modifying a select point common to the first subset and the second subset such that the first spline curve and the second spline curve are smoothly joined at the select point.

In another aspect, modifying the select point common to the first subset and the second subset such that the first spline curve and the second spline curve are smoothly joined at the modified point further includes modifying the first and second subset of points such that the adjacent segments have a same value of the first derivative at shared points between the first and second subset of points.

In another aspect, the modifying the select point common to the first subset and the second subset such that the first spline curve and the second spline curve are smoothly joined at the modified point further includes determining a prior point and a subsequent point to the select point, and modifying coordinates of the select point such that the prior point, the select point, and the subsequent point are arranged along a common line.

In another aspect, injecting a plurality of projected input events into the remote server for the application until subsequent input command data is received. The injecting includes calculating a plurality of projected points by extrapolating the first spline curve and generating a plurality of projected input events specifying the projected points.

In another aspect, calculating the plurality of intermediate points along the first spline curve and generating the plurality of simulated input events specifying the intermediate points are performed in response to determining that the input command data specifies a mouse movement while a mouse button depressed.

In another aspect, calculating the plurality of intermediate points along the first spline curve, and generating the plurality of simulated input events specifying the intermediate points are performed in response to determining that the application comprises an active drawing canvas control element.

In another aspect, the input command data are derived from at least one of mouse input events and gesture input events captured at the client device.

According to another exemplary aspect, a system for managing user input for a remote application session between a client device and the system is provided. The system includes a memory device and a hardware processor communicatively coupled to the memory device. The hardware processor is configured to receive, from a client device, input command data for an application executing within a remote session established between the client device and the system. The input command data specifies a plurality of points within a graphical user interface where the input command data was captured on the client device. The hardware processor is further configured to calculate a first spline curve based on a first subset of sequential points from the plurality of points, generate a plurality of simulated input events specifying a plurality of intermediate points calculated along the first spline curve, and inject the plurality of simulated input events into the system for the application.

According to another exemplary aspect, a computer-readable medium is provided comprising instructions that comprises computer executable instructions for performing any of the methods disclosed herein.

According to another exemplary aspect of the present disclosure, a method for managing user input for a remote application session between a client device and a remote server is provided. The method includes receiving, from a client device, input command data for an application executing within a remote session established between the client device and the remote server. The input command data specifies a plurality of points within a graphical user interface where the input command data was captured on the client device. The method further includes determining whether the input command data is associated with a drawing activity, and responsive to determining that the input command data is associated with a drawing activity, injecting a plurality of simulated input events into the remote server for the application based on data interpolated from the plurality of points.

In another aspect, the actions of determining whether the input command data is associated with a drawing activity further includes determining whether the input command data specifies a mouse movement while a mouse button depressed.

In another aspect, the actions of determining whether the input command data is associated with a drawing activity further includes querying a graphical user interface of the application executing within the remote session using an application programming interface (API) configured to provide data describing the graphical user interface. The method further includes determining whether the graphical user interface of the application executing within the remote session includes a drawing canvas control element.

In another aspect, the actions of determining whether the input command data is associated with a drawing activity further includes determining whether the application executing within the remote session matches a predetermined list of applications having a drawing capability.

In another aspect, the method further includes responsive to determining that the input command data is not associated with a drawing activity, generating a plurality of simulated input events specifying the plurality of points from the input command data, and injecting the plurality of simulated input events into the remote server for the application.

In another aspect, the actions of injecting the plurality of simulated input events into the remote server for the application based on data interpolated from the plurality of points further includes: calculating a first spline curve based on a first subset of sequential points from the plurality of points; and generating the plurality of simulated input events specifying a plurality of intermediate points calculated along the first spline curve.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing user input for a remote application session between a client device and a remote server. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
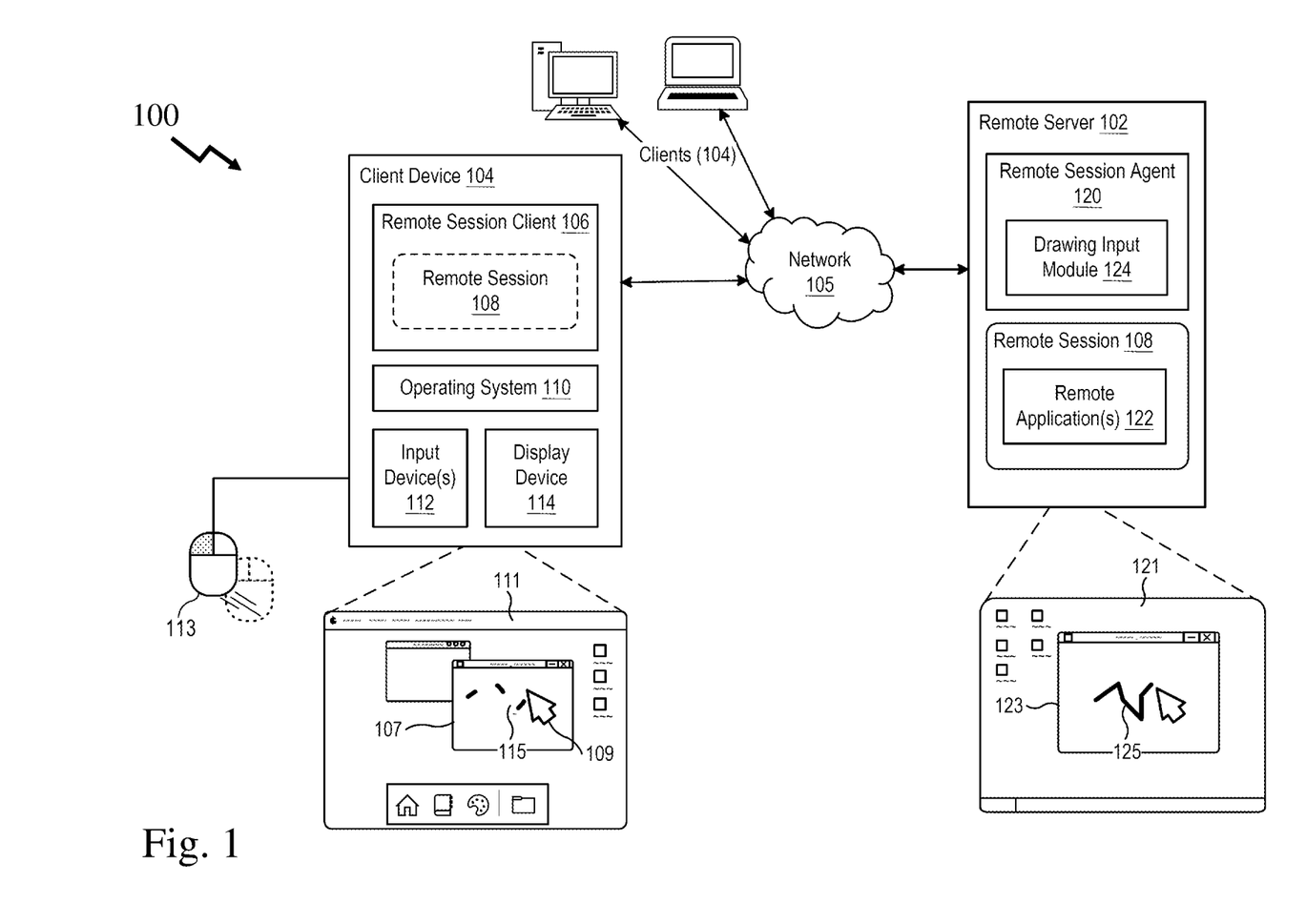
FIG. 1 is a block diagram illustrating a system for managing user input for a remote application session between a client device and a remote server according to an exemplary aspect.

FIG. 1 is a block diagram illustrating a system for managing user input for a remote application session between a client device and a remote server according to an exemplary aspect. The system 100 includes a remote server 102 communicatively connected to one or more client devices 104 by a communications network 105. The client device(s) 104 and/or the remote server 102 may be any computing device, physical server, computer server, desktop, laptop, handheld device, tablet device, smartphone, or any other electronic device as described herein. The network connection between the client device(s) 104 and the remote server 102 may be a network socket, or other more complex communication channel. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the client device 104 includes a remote session client 106 configured to establish a remote session 108 with a remote session agent 120 executing on the remote server 102. The remote session 108 established between the remote session client 106 and the remote server 102 may be configured to provide access at the client device 104 to one or more "remote" applications 122 executing on the remote server 102. In some cases, the remote applications 122 may be software programs or versions of software programs that might not be otherwise available or installed locally on the client device 104. In one aspect, the remote session agent 120 may be a remote application server (RAS) agent configured to remotely provide instances of software applications to the client device 104. In other words, the remote session agent 120 is said to "publish" resources, which can include one or more remote or "published" applications, to a client device 104, which is rendered and displayed on a local display device of the client device 104. The remote server 102 may be a virtual application and desktop delivery system that allows users to access and use applications and data from any device, such as the client device 104.

In some aspects, the remote session client 106 is a software application that establishes the remote session 108 as a connection to a new instance of a virtual desktop (e.g., a virtual machine) instantiated by the remote server 102 specifically for a remote session 108, and that allows access to a user's data and applications (e.g., via a roaming profile). An example of a remote session client 106 may be a Parallels® RAS Client (Remote Application Server™ Client) software application. In other aspects, the remote session client 106 may be a remote access application that establishes the remote session 108 as a remote desktop connection to a specific computing device (having the remote session agent 120 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®). In some aspects, the remote session agent 120 may provide a virtual desktop environment, sometimes referred to as a virtual desktop infrastructure (VDI) for executing applications and accessing data (e.g., private files). The remote session 108 may be implemented using a remote desktop protocol, such as Remote Desktop Protocol (RDP), Parallels Access protocol, Virtual Network Computing (VNC), or Personal Computer over Internet Protocol (PCoIP).

In one aspect, the client device 104 further includes an operating system 110, one or more input device(s) 112, and at least one display device 114. The operating system 110 is configured to support execution of the remote session client 106, which includes handling input data received from the one or more input devices 112 as user input to the remote session client 106 and managing the rendering and display of a graphical user interface associated with the remote session client 106 on the display device 114 (e.g., monitor, screen). In some aspects, the operating system 110 may include an input subsystem (not shown) for triggering system-level input events from the raw data and signals received from the input devices 112, where such input events can then be consumed by the operating system 110 or applications, such as the remote session client 106. The input device(s) 112 are communicatively connected to the client device 104 and include one or more components (e.g., buttons, scroll wheel, proximity sensors) configured to generate input data in response to user actions (e.g., button click, key activation, motion, gesture) for manipulating and interacting with a graphical user interface of the client device 104. Examples of the input devices 112 include a computer mouse, joystick, trackpad, trackball, pointing device, stylus, touchscreen, or a keyboard.

In one example operation, a user starts execution of the remote session client 106 on the client device 104. The remote session client 106 may (e.g., as directed by user input) open a remote session 108 to a host by establishing a connection channel with the remote session agent 120 executing on the remote server 102. The remote session agent 120 may execute the remote session 108 by instantiating a virtual machine on the remote server 102 that corresponds to the remote session 108. During execution, the remote session client 106 and remote session agent 120 exchange input data, output data, and other remote session protocol data. The output data (e.g., transmitted from the remote session agent 120 to the remote session client 106) may include data such as graphical data, framebuffers, graphical primitives (e.g., controls, forms, fonts, and colors), and event data used to generate, at the client-side, a graphical user interface representing the remote desktop.

As shown in FIG. 1, the remote session client 106 renders, for display on the display device 114 that is operatively connected to the client device 104, a graphical user interface (GUI) 107 corresponding to the remote session 108. The GUI 107 corresponding to the remote session 108 is rendered based at least in part on the received output data from the remote session agent 120. The GUI 107 may graphically depict an entire (remote) desktop (121), a portion of a desktop, a single windowed application (123), or multiple windows, of remote applications 122 and other resources that are executing as part of the remote session 108. The remote session client 106 may render the GUI 107 in a variety of view modes of operation, including a full-screen mode, a windowed mode, a seamless mode, and a modality mode.

The remote session client 106 is configured to transmit or relay, to the remote session agent 120, user input data corresponding to the user's interactions with the GUI 107. For example, when the user moves an input device (represented within the GUI 111 by a pointer 109) across the window GUI 107, user input data is generated by the input devices 112, such as keyboard data or mouse data related to the user interaction with the graphical user interface 107 used to control the remote session 108. The remote session client 106 can relay such raw input data through the remote session for handling by the remote session agent 120. Or, such raw input data can trigger the creation of client input events (by the operating system 110) that are intercepted by the remote session client 106 and translated into input command data sent through the remote session for handling by the remote session agent 120. For example, in some implementations, to emulate a touch or mouse interaction with a remote application, the remote session client 106 catches touch or mouse input events from the operating system 110 (via an operating system Application Programming Interface, or API), translates the events to input emulation commands, in terms of a remote access protocol (e.g., Microsoft® Remote Desktop Protocol, or Parallels®

Access Protocol), and then sends the input emulation commands to a remote computer (e.g., remote server 102). At the remote computer, a corresponding server component (e.g., remote session agent 120) parses those input emulation commands, forms input events using a system API of remote host OS, and injects them into the system, which then dispatches those events to an active application (e.g., remote application 122), which handles and behaves as if the user was interacting with the active application locally.

In one example operation, the user may operate the input device (e.g., mouse 113) by clicking on the left mouse button while at a certain position within the window GUI 107 of the remote application and subsequently moved the mouse 113. The operating system 110 receives raw input data from the mouse 113 and registers this raw input data as a stream of mouse left-button drag input events. These input events represent an input path (shown as path 115) drawn by the user at a sequence of points within the window GUI 107 managed by the remote session client 106. While aspects of the present disclosure refer to "mouse" events, it is understood that the actual input device used to generate the input event may be other (non-mouse) input devices, such as a stylus, trackpad, a touch input device, which generate input events (e.g., Ink Events, gestures) that the operating system 110 can map to, or use to emulate, corresponding mouse input events.

In current approaches for remote desktop sessions, a mouse event generation scheme is used that is based on a direct translation of a device's input event data as-is, at that the input events are sent and processed by a remote server individually. That is, as event data (i.e., event1, event2, . . . , eventN) is received by a client application (e.g., remote session client 106) with points $P_1, P_2, \ldots, P_N$), the points are transferred and sent to the host (e.g., remote server 102) one-by-one. Interaction with application and desktops running on a remote computer is subject to delays related to varying network conditions between the client device and the remote server that the remote application or remote desktop is executing on.

Because of network delays and other reasons, the rate with which emulated input commands are received by a remote application can be significantly different from the rate the original input events are generated on the client device 104. As a result, the remote application's visual response to the input events captured on the client device would be considerably different compared to a locally-executing application on the client device. Drawing lags behind a mouse device's movements (or, the movements of a touch input object, finger, stylus, etc.); curves are not drawn smoothly. This issue affects the user's experience, as it would be difficult for a user to draw an accurate curved or smooth line (e.g., drawing one's signature) in a remote application under such circumstances even though, on a client device, such input is performed accurately (e.g., with a digital pen).

It has been determined that curve smoothness directly depends on the rate of touch/mouse events the remote application receives. If the rate of events is too low, then a broken line, instead of a smooth one, will be drawn by the remote painting application (depicted as jagged line 125 in FIG. 1). When an application is running locally on the client device, the rate of touch/mouse events the application gets from the local operating system 110 depends on the hardware capabilities of the input device, as well as the implementations of the device driver(s) and specific operating system. For remote applications, an insufficient rate of input events to draw smooth curves in a remotely-executing application can be caused by low capture frequency and/or low injection frequency. Low input event capture frequency causes the distance between two consecutively captured touch points to be excessive. Low input event injection frequency may occur client-side input events or emulated commands have not arrived yet. In either case, instead of drawing a visually smooth line, the path 115 is perceived as a broken or erratic line drawing 125.

According to one aspect, the remote server 102 includes a special intermediate module, referred to herein as a drawing input module 124, that is configured to ensure that input events are injected at a constant rate and with a frequency which is high enough to produce a smooth freehand-like drawing input. In one aspect, the drawing input module 124 is configured to transform data from the input commands into a flow of input events, which are generated with a predefined constant rate, such that the input events' coordinates are adjusted to for a smooth curve. In one aspect, the drawing input module 124 may be communicatively disposed between the input commands receiver and the input events injector (e.g., of the remote session agent 120). While the drawing input module 124 is depicted in FIG. 1 as a sub-component of the remote session agent 120, it is understood that other configurations are possible, such as the drawing input module as a module separate from the remote session agent, or the drawing input module as a sub-module within the operating system of the remote server.

FIGS. 2A, 2B, 2C, and 2D depict a technique for handling input command data for a remote session according to an exemplary aspect. The described technique may be used for the consecutive formation of a smooth line based on points received and may be performed by the drawing input module 124 or other sub-system within the system 100.

Input command data received from the client device provides positions where the event has been captured on the client device. Those positions may form an array of points $P_i(X_i, Y_i)$, where $X_i$ and $Y_i$ are a function of time (t) when the particular input event has been captured on the input device. Each point may be presented by coordinate values (e.g., X, Y) within a coordinate system defined by the local graphical user interfaces 107 or 111.

Based on these points, the drawing input module 124 may construct a smooth line using spline curves, which are functions defined piecewise by polynomial functions with a given continuity level N (i.e., two adjacent spline pieces at a given joint meet in their value and first N−1 derivatives). In one aspect, the drawing input module 124 may construct spline curves using segments of points $P_i$, including a start point, an end point, and one or more control points that define the curvature of the spline curve. For example, the drawing input module 124 may split up the array of $P_i$ points into 3-point segments (having a start point, an end point, and a control point), and each of which will form its own quadratic Bezier curve (having a polynomial function of a second order). In order to have a visually smooth curve as a whole (i.e., across the totality of segments), the drawing input module 124 may adjust certain points such that curves constructed on each of two adjacent segments have the same value of the first derivative (i.e. same tangent line) at the point of their joint, as described in greater detail below.

Figure 2A:
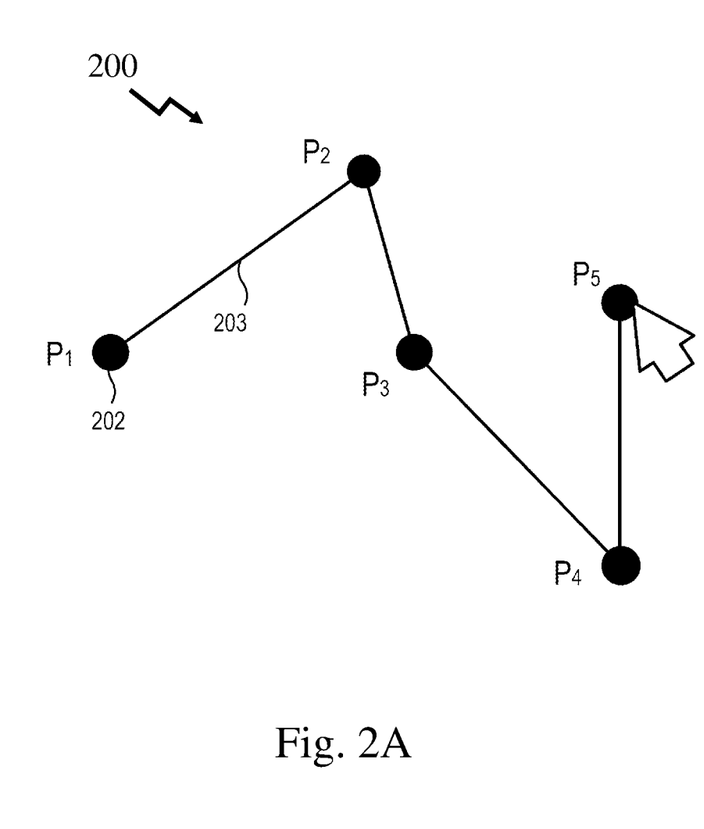
FIGS. 2A, 2B, 2C, and 2D depict a technique for handling input command data for a remote session according to an exemplary aspect.
Figure 2B:
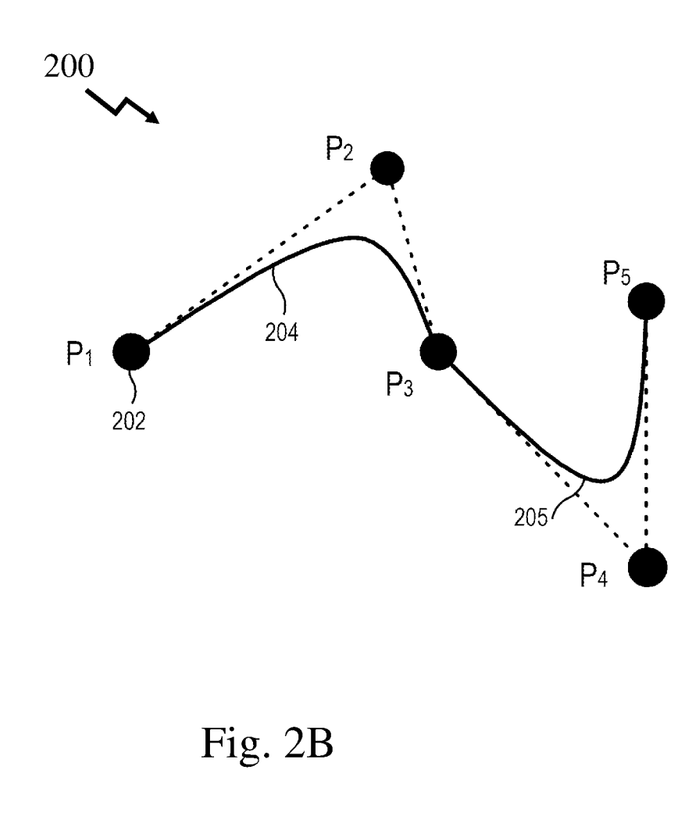

As shown in FIG. 2A, the drawing input module 124 receives input command data 200 that includes a sequence of points 202 ($P_1, P_2, P_3, P_4$, and at a later time, $P_5$), which represent a line of input data provided by the user interacting with the client device. If the points were simply joined by straight line 203, as shown in FIG. 2A, the resulting line $\{P_1, P_2, P_3, P_4, P_5\}$ would manifest as a broken and jagged line of mouse input events at the remote application. Instead, the drawing input module 124 divides the points into segments $\{P_1, P_2, P_3\}$ and $\{P_3, P_4, P_5\}$, and constructs a Bezier curve for each. As shown in FIG. 2B, the drawing input module calculates a first spline curve 204 based on the subset of points $\{P_1, P_2, P_3\}$, where $P_1$ is the start point, $P_3$ is the end point, and $P_2$ is the control point. The drawing input module calculates a second spline curve 205 based on a consecutive subset of points $\{P_3, P_4, P_5\}$, where $P_3$ is the start point, $P_5$ is the end point, and $P_4$ is the control point. In this example, the spline curves 204 and 205 are joined at common point $P_3$ that is shared between the first subset of points and the next subset of points.

Figure 2C:
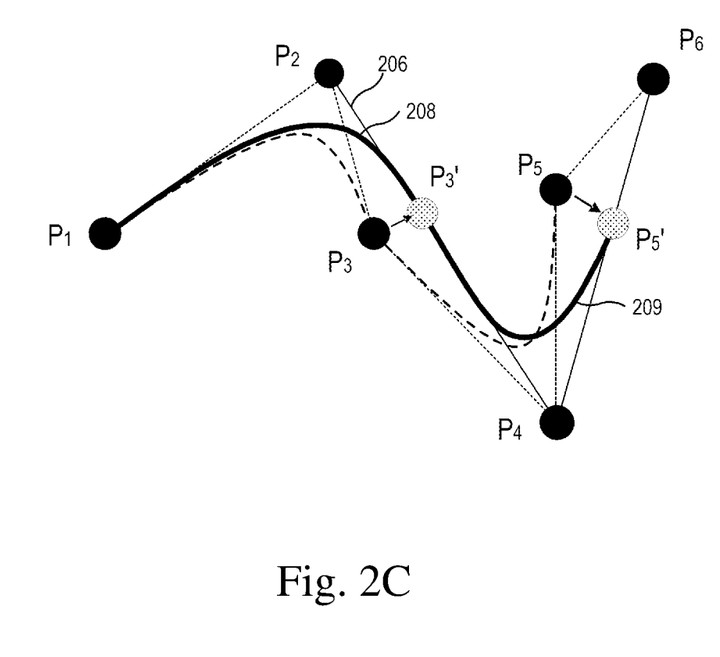

It is noted that using the two segments $\{P_1, P_2, P_3\}$ and $\{P_3, P_4, P_5\}$ independently to draw the two Bezier curves, the resulting curve may visually break at the point $P_3$ (i.e., the tangent lines $[P_2, P_3]$ and $[P_3, P_4]$ are different). To improve this jagged line, the drawing input module may modify select point(s) common to consecutive subsets of points $P_1$ such that spline curves formed from the subsets (including the modified point(s)) are smoothly joined at the select point(s). For example, as shown in FIG. 2C, the drawing input module adjusts the position of $P_3$ to $P_3'$ by changing the coordinate values $(X_3, Y_3)$ of point $P_3$ such that the points $P_2$, $P_4$, and $P_3'$ resides on the same line (206). In this case, the two Bezier curves 208, 209 constructed from the segments $\{P_1, P_2, P_3'\}$ and $\{P_3', P_4, P_5\}$ will have a smooth joint at the point $P_3'$, regardless of the position of the point $P_5$. So, as soon as the input command data specifying the points $P_1, P_2, P_3, P_4$ are received, the first segment $\{P_1, P_2, P_3'\}$ is fully defined and can be used for input events calculation and injection, described below. Repeating the procedure for points $P_3', P_4, P_5$ and, when received at a later time, $P_6$, the drawing input module defines a second curve segment $\{P3', P_4, P_5'\}$, and so forth.

It is understood that after mouse events have been injected, the remote application which finally receives the mouse events will draw a line by linear segments, consecutively connecting points received from the injected input events. The distance between consecutive points should be small (i.e., no more than several pixels) in order to produce a visually smooth line. Since the distances between points $P_i$ received from the input command data can be larger than that, the drawing input module 124 is configured to inject a certain amount of "fake" intermediate points calculated from the Bezier curves constructed above. The "fake" points are not actual received points but rather are interpolated from actual received points.

Figure 2D:
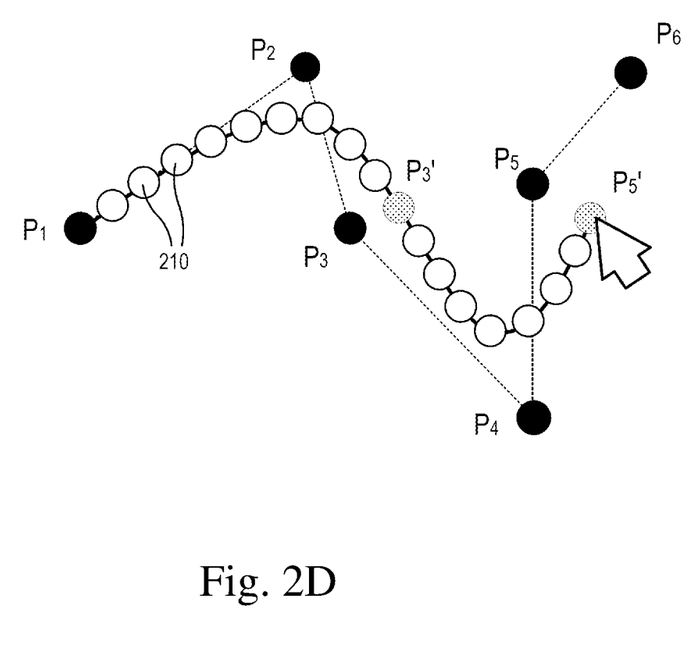

In one aspect, as shown in FIG. 2D, the drawing input module 124 calculates (interpolates) intermediate points 210 that along the spline curves and generates simulated input events for each such intermediate points. In one implementation, the drawing input module 124 may use a polynomial equation (function B(a)) configured to calculate (interpolate) points of a curve passing through a start point and an end point, with a control point that defines the line's curvature. For example, each point of the Bezier curve formed from start point $P_1$, the end point $P_3'$, and the control point $P_2$ can be calculated from the function shown in following Equation (1):

$$B(a)=P_2+(1-a)^2(P_1-P_2)+a^2(P_3'-P_2), \text{ where } 0 \leq a \leq 1. \tag{1}$$

In this case, $P_i$ and B are points in a 2-dimensional space (i.e., on a plane). The parameter "a" signifies intermediate points of the Bezier curve. Varying the parameter "a", the drawing input module 124 may determine different points of the Bezier curve: when a=0, $B(0)=P_1$ (i.e., the first point B(0) coincides with the point $P_1$); when a=1, $B(1)=P_3'$ (i.e., point B(1) coincides with the point $P_3'$). Any value of "a" between 0 and 1 can define exactly one point of the Bezier curve(a). So, when the drawing input module needs to calculate a number of points on the Bezier curve between points $P_1$ and $P_3'$, a set of "a" values between 0 and 1 (e.g., 0, 0.1, 0.2, ... 0.9, 1) are used, and coordinates of the intermediate points $B_1$ are calculated according to the equation. In one aspect, the drawing input module calculates as many "fake" intermediate points so as to emulate input event generation with a desired time interval which is less than the time interval between "real" points capturing. For example, the number of intermediate points needed to produce a smooth series of input events can be estimated as $(T_4-T_1)/dt-1$, where $T_4$ and $T_1$ are timestamps corresponding to when points $P_4$ and $P_1$, respectively, have been captured. Accordingly, knowing distances between points received and varying the parameter "a", the drawing input module 124 may calculate the target amount of interpolated points 210.

Figure 3A:
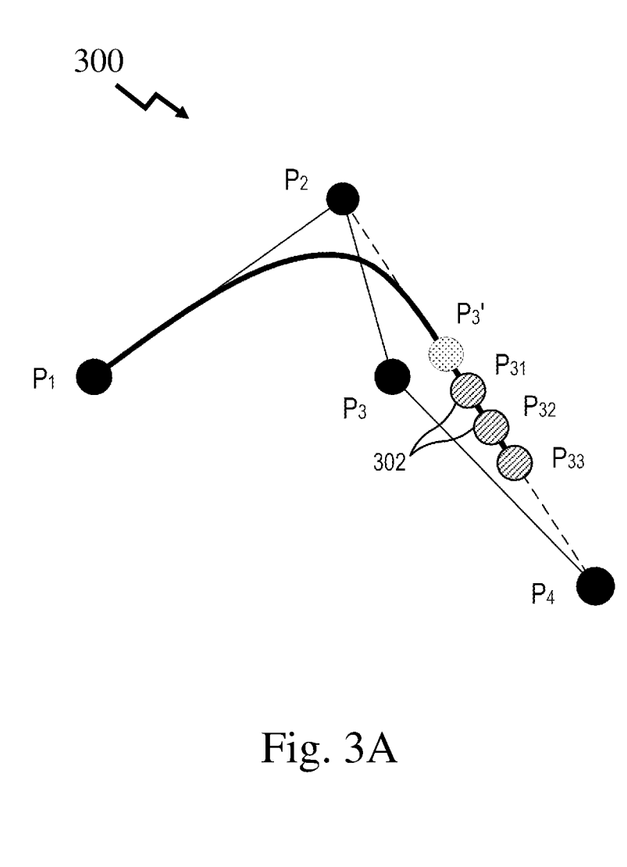
FIGS. 3A and 3B depict a technique for extrapolating input command data for a remote session according to an exemplary aspect.
Figure 3B:
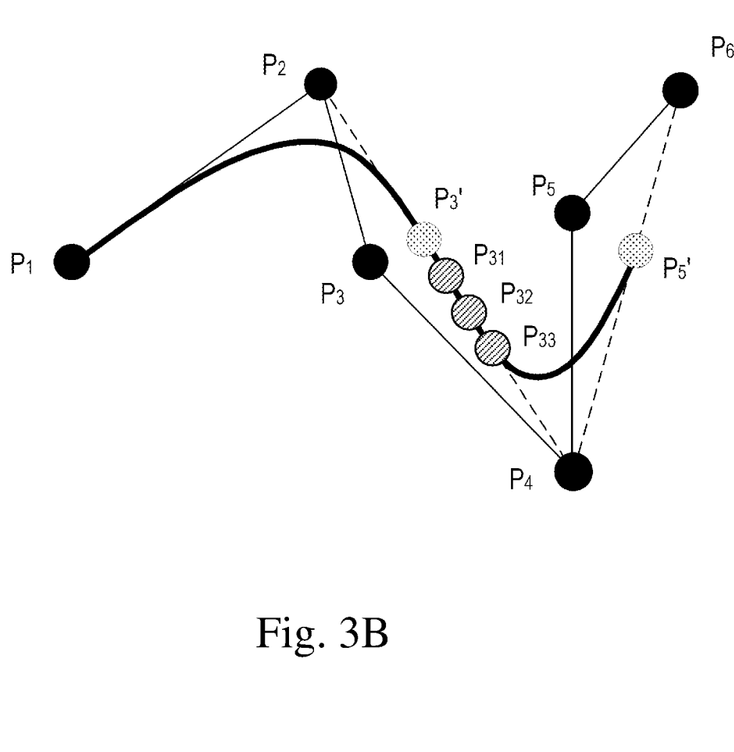

FIGS. 3A and 3B depict a technique for extrapolating input command data for a remote session according to an exemplary aspect. In order to produce a visually smooth and responsive drawing, the time frequency of input event injection should be high enough such that the drawn line does not lag behind the pointing device or user's finger. Since the time frequency of receiving input commands can be unpredictable and, at times, delayed, the drawing input module 124 may calculate (extrapolate) "future" or projected points by extrapolating the Bezier curves which have been previously constructed from the points received so far.

In one aspect, the drawing input module 124 may be configured to calculate projected points 302 by extrapolating the spline curve(s) and generate "projected" (extrapolated) input events specifying those projected points 302. Then, the drawing input module may inject the projected input events into the remote server for the application until subsequent input command data is received. For example, as shown in FIG. 3A, until further input commands (e.g., points $P_5$ and $P_6$) are received, the drawing input module calculates intermediate points $P_{31}, P_{32}, P_{33}, \ldots$ which are added to the line $[P_3', P_4]$. Each intermediate point may be calculated as a function of the vector difference between the last received points, time difference between the last received points, and/or a desired time interval for input event injection. In one implementation, each intermediate point is calculated by the formula below:

$$P_{3i}=P_3'+(P_4-P_3')*i*dt/(T_4-T_3), \tag{2}$$

where $T_3$ and $T_4$ are the time stamps when points $P_3$ and $P_4$ has been captured, and dt is a desired time interval for input events injection (e.g. 4 ms).

As soon as subsequent input command data is received, the drawing input module 124 may cease injecting projected input events and returns to constructing spline curves from the received points. For example, as shown in FIG. 3B, as soon as points $P_5$ and $P_6$ are received, the drawing input module 124 constructs a next Bezier curve $\{P_{3N}, P_4, P_5'\}$ and injects the interpolated input events, as described above.

It is noted that calculation of interpolated or extrapolated points may consume an increased amount of the server's computing resources. In one aspect, the drawing input module may be configured to dynamically enable (or throttle) the above-described mechanisms based on whether a currently focused remote application needs to receive input events at a high and constant rate, e.g., during a drawing or handwriting activity. For example, it has been determined that ordinary mouse movements without any buttons pressed might not benefit from the presently described smoothing technique, as these movements aim to simply position mouse pointer at some ultimate point of the screen, and exact mouse cursor movement path to that ultimate point is not visible to a user. In contrast, the technical advantages of the presently described smoothing may be particularly effective when there are detected mouse movements together with the mouse button depressed, which can correspond to a painting or drawing action.

In one aspect, the drawing input module may be configured to detect situations in which input command data for a remote application should be used for the interpolation and/or extrapolation of points for injected input events. In some aspects, the drawing input module may be configured to do so in response to determining that the input command data specifies a mouse movement while a mouse button depressed. In some aspects, the drawing input module may be configured to do so in response to determining that the application comprises a drawing canvas control element. For example, a remote application with drawing or handwriting capabilities may use a canvas control element of a graphical user interface. The remote session agent 120 may be configured to detect such a canvas control element by querying the active remote application using a platform API configured to provide programmatic access to graphical user interface elements and the data they contain (e.g., UIAutomation, UIAccessibility libraries). In some aspects, the platform API may be an accessibility API exposed by the operating system to enable third-party applications (e.g., assistive software, screen readers) to obtain information about the UI and to manipulate the UI by means other than standard input. In some aspects, the platform API may be a testing API exposed by the operating system to enable developers to write automated testing scripts to interact with the UI of an application. If the platform API fails to detect a drawing canvas control, the remote session agent may refrain from enabling the drawing smoothing functionality (or dynamically disable any currently-enabled drawing smoothing functionality. In another aspect, the remote session agent may be configured to detect whether the input command data is associated with a drawing activity by checking whether the remote application or related data (e.g., application name, active process name, bundle identifier, executable name, etc.) matches a predefined list of known applications with drawing capabilities. If the active application is detected to benefit from the drawing smoothing algorithm described above, the remote session agent activates the smoothing mechanism of the drawing input module, and extra input events are injected. The remote session agents the input commands as input events as during normal mode of operation. It is understood that any combination of the tests for dynamically enabling the drawing smoothing functionality can be used. For example, if the remote session agent fails to detect a drawing canvas control using the platform API, the remote session agent may proceed check whether the remote application matches the predefined list of known applications with drawing capabilities.

The technical result of the described technique is that, in addition to local input events capturing and generation improvements, the solution provided operates on the server side of the remote access client/server system, improving emulated input events injection as well, reducing input event delays and non-uniform injection caused by unpredictable delays during input commands transmission over network from client device to a server. Further, the described technique also optimizes the client's and server's computational resources usage, for input events interpolation/extrapolation calculation, by detecting whether the active remote application needs the smoothed touch/mouse input or not.

Figure 4:
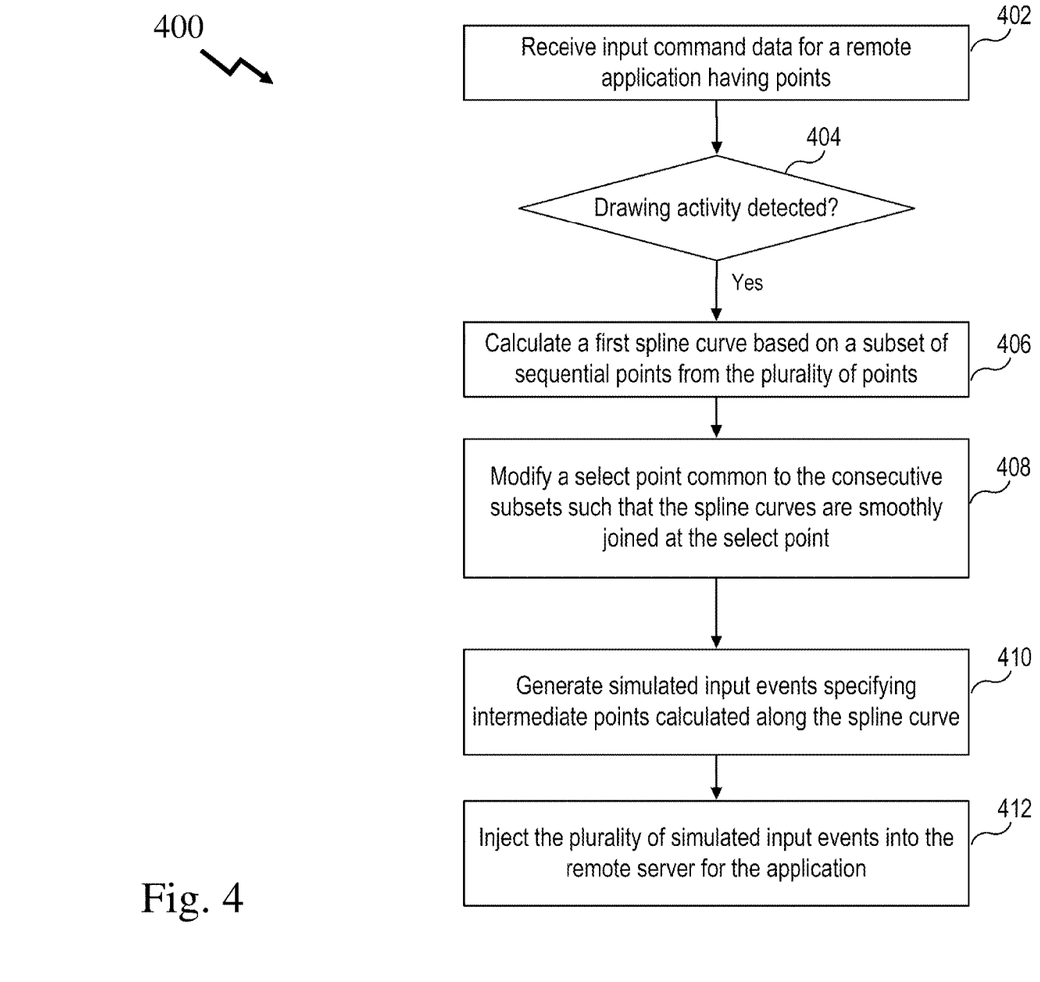
FIG. 4 is a flowchart illustrating a method for managing user input for a remote application session between a client device and a remote server according to an exemplary aspect.

FIG. 4 is a flowchart illustrating a method 400 for managing user input for a remote application session between a client device and a remote server according to an exemplary aspect. It is noted that the following description of the exemplary method makes reference to the system and components described above, such as in FIG. 1.

The method 400 begins at step 402, in which the remote session agent 120 (e.g., executing on the remote server 102) receives, from a client device 104, input command data for an application executing within a remote session established between the client device and the remote server. The input command data may specify a plurality of points within a graphical user interface where the input command data was captured on the client device. The input command data are derived from at least one of mouse input events and gesture input events captured at the client device At step 404, the remote session agent 120 may detect a drawing activity is occurring and/or determine whether the remote application is associated with a drawing activity. In some aspects, the remote session agent 120 may that a drawing activity is detected likely occurring based on the active remote application. For example, the remote session agent 120 may retrieve metadata associated with the graphical user interface of the remote application having the active focus within the GUI 121 and determine that the application includes an active drawing canvas control element configured to receive drawing inputs from the user. In another example, the remote session agent 120 may retrieve identifying information about the active remote application and compare the information to a pre-determined list of known drawing applications or applications with drawing-like capabilities.

In other aspects, the remote session agent 120 may detect a drawing activity in response to determining that the input command data specifies a mouse movement while a mouse button depressed. In some aspects, the input command data may correspond to input data specifying left mouse button down action and mouse movement as generated by an input device 112. While aspects of the present disclosure refer to "mouse" events, it is understood that the actual input device used to generate the input event may be other (non-mouse) input devices, such as a stylus, trackpad, a touch input device. Such other input devices may generate input events (e.g., Ink Events, gestures) that the operating system 110 can map to, or use to emulate, corresponding mouse input events. It is understood that the subsequent mouse drags events and the initial mouse drag event are part of the same continuous user interaction with the input device, which may be comprised of a sequence of a mouse left-button down event, a plurality of mouse movement events (and mouse drag events), and a mouse left-button release event. As such, the initial mouse drag event may be part of multiple initial mouse drag events that occur in the beginning of a user interaction with the graphical user interface and the subsequent mouse drag events are the remainder of the drag events in that same user interaction.

If a drawing activity or drawing application is detected, the remote session agent 120 may dynamically enable the below drawing input smoothing mechanism. In some aspects, the remote session may characterize the drawing activity as a probability (that a drawing activity is occurring) and use such probability to dynamically throttle the smoothing mechanism. In this way, the less likely a drawing activity is occurring, the less interpolation input events are calculated and injected, thereby consuming less computing resources.

At step 406, the drawing input module 124 may calculate a first spline curve based on a first subset of sequential points from the plurality of points. In some aspects, the first spline curve may be a quadratic Bezier curve generated based on the first subset of points comprised of a start point, a control point, and an end point, wherein the control point defines a curvature of the spline curve. In some aspects, the drawing input module may generate the first spline curve based on a first sequential subset of the points and then construct a second spline curve based on a second sequential subset of the points.

At step 408, the drawing input module 124 modifies a select point common to the first subset and the second subset such that the first spline curve and the second spline curve are smoothly joined at the select point. In some aspects, the drawing input module modifies the first and second set of points such that the adjacent segments have a same value of the first derivative at shared points between the first and second set of points. In some aspects, the drawing input module determines a prior point and a subsequent point to the select point, and modifies the coordinates of the select point such that the prior point, the select point, and the subsequent point are arranged along a common line.

At step 410, the drawing input module 124 generates a plurality of simulated input events specifying a plurality of intermediate points calculated along the first spline curve. At step 412, the drawing input module 124 injects the plurality of simulated input events into the remote server for the application. In some aspects, the server-side operating system dispatches those input events to an application (e.g., remote application 122), which currently has an input focus, so that the application can handle those events and react to them in an application-specific way. Finally, the updated application view is captured and transmitted back to the client device. The remote session client updates the remote session screen, such that the user gets the impression that the screen image is updated following their interactions with the input device (e.g., touch screen, trackpad, mouse device). For example, a new curve appears in a painting or handwriting application, and the smooth the line, the more natural the user experience is.

In some aspects, the drawing input module may inject a plurality of projected input events into the remote server for the application until subsequent input command data is received, wherein the injecting comprises calculating a plurality of projected points by extrapolating the first spline curve and generating a plurality of projected input events specifying the projected points.

Figure 5:
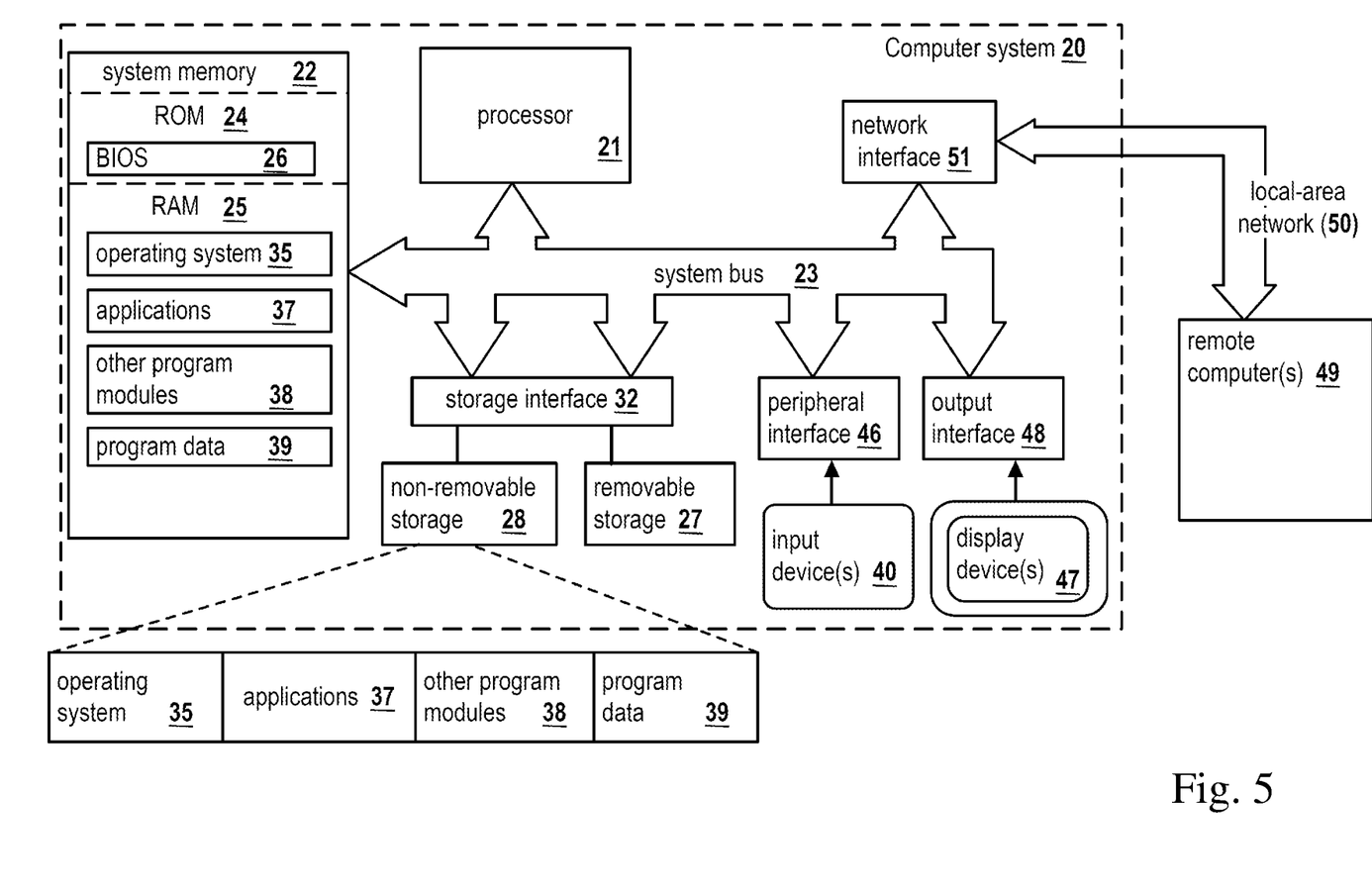
FIG. 5 is a block diagram of a computer system on which the disclosed system and method can be implemented according to an exemplary aspect.

FIG. 5 is a block diagram illustrating a computer system 20 on which aspects of systems and methods for managing user input for a remote application session between a client device and a remote server may be implemented in accordance with an exemplary aspect. It should be noted that the computer system 20 can correspond to the client devices 104 and remote server 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing user input for a remote application session between a client device and a remote server, the method comprising:
    receiving with an input module, from a client device, input command data intended for an application executing within a remote session established between the client device and the remote server, wherein the input command data specifies a plurality of points established by a user of the application within a graphical user interface of the client device where the input command data was captured on the client device;
    determining whether to dynamically enable the input module; and
    upon a positive determination enabling the input module; wherein
    when enabled the input module executes a process comprising:
        generating with the input module a plurality of simulated input events specifying a plurality of points calculated in dependence upon the input command data; and
        injecting with the input module the plurality of simulated input events into the application executing within the remote server;
    the plurality of simulated input events are employed by the application executing within the remote server as input command data for the application instead of the input command data captured upon the client device;
    the application handles and behaves in dependence upon the plurality of input events as if a user were interacting with the application locally; and
    generating with the input module a plurality of simulated input events specifying a plurality of points calculated in dependence upon the input command data comprises:
        calculating with the input module a first spline curve based only upon a first subset of sequential points of the plurality of points;
        calculating a second spline curve based on a second sequential subset of the plurality of point; and
        automatically with the input module modifying coordinates of a select point representing a final point in the first sequential subset of the points and a first point in the second sequential subset of the points such that the first spline curve and the second spline curve are smoothly joined at the select point by the steps of:
            establishing with the input module a prior point within the first sequential subset of the points, the prior point being the point within the first sequential subset of the points established by the user immediately prior to establishing the select point;
            establishing with the input module a subsequent point to the select point within the second sequential subset of the points, the subsequent point being the point within the second sequential subset of the points established by the user immediately subsequent to establishing the select point; and
            automatically modifying with the input module the coordinates of the select point such that the prior point, the select point, and the subsequent point are arranged along a straight line;
        generating with the input module a plurality of simulated input events specifying a plurality of intermediate points calculated along the first spline curve; and
        injecting with the input module the plurality of simulated input events into the application executing within the remote server.

2. The method according to claim 1, wherein
    the plurality of simulated input events represent simulated input command data;
    the simulated input command data represents simulated input events performed by the user of the application within the graphical interface of the client device; and
    the plurality of simulated input events represent input events occurring at a predefined constant rate.

3. The method according to claim 1, further comprising
    determining upon enabling the input module whether the application executing within the remote session should receive input events at a constant rate; and
    upon a positive determination the input module executes the steps of calculating, generating, and injecting the simulated input events into the application executing within the remote server such that the simulated input events are provided to the remote session at the constant rate; wherein
    the application executing within the remote server treats the plurality of simulated input events from the input module as the user establishing a series of user inputs with the user interface of the client device at the constant rate.

4. The method according to claim 1, further comprising
    determining with the input module upon enabling the input module whether the application executing within the remote session should receive input events at a constant rate; and
    upon a positive determination the input module executes the steps of calculating, generating, and injecting the simulated input events into the application executing within the remote server such that the simulated input events are provided to the remote session at the constant rate; wherein
    the application executing within the remote server treats the plurality of simulated input events from the input module as the user establishing a series of user inputs with the user interface of the client device at the constant rate; and
    one of:
        the determination by the input module whether the application should receive input events at the constant rate is made in dependence upon whether the application in execution within the remote session comprises a canvas control element;

the determination by the input module whether the application should receive input events at the constant rate is made in dependence upon whether the application in execution within the remote session matches an entry within a list of applications with drawing capabilities; and the determination by the input module whether the application should receive input events at the constant rate is made in dependence upon whether the input command data was captured on the client device from an input device generating input events comprising ink events or gestures.

5. The method according to claim 1, wherein
determining whether to dynamically enable the input module is established in dependence upon determining that a rate at which input command data is received by the application in execution within the remote session is different from the rate at which the input command data was captured on the client device.

6. The method according to claim 1, wherein
determining whether to dynamically enable the input module is established in dependence upon determining that the input command data relates to the generation of a signature within the application by a user of the application; and
the plurality of simulated input events are stored by the application executing within the remote server for rendering the user's signature.

7. The method according to claim 1, wherein
the input command data relates to input events established by a user of the application; and
determining whether to dynamically enable the input module is established in dependence upon the input module determining that a rate of the input events is insufficient due to at least one of a low capture frequency and low input event injection frequency.

8. The method according to claim 1, wherein
the input module performs the steps of calculating, generating and injecting to establish the plurality of simulated input events as projected input events established within the graphical user interface of the client device by the user after the input command data was received until subsequent input command data is received; and
at least one of:
the input module calculates the plurality of simulated input events in dependence upon a function of a vector difference between the last received pair of points; and
the input module calculates the plurality of simulated input events in dependence upon a time difference between the last received pair of points.

9. The method according to claim 1, wherein
the input module performs the steps of calculating, generating and injecting to establish the plurality of simulated input events as projected input events established within the graphical user interface of the client device by the user after the input command data was received until subsequent input command data is received;
the input command data relates to input events established by a user of the application; and
at least one of:
the input module calculates the plurality of simulated input events in dependence upon a time interval for input event injection associated with the application;
the input module calculates the plurality of simulated input events in dependence upon a function of a vector difference between a last pair of input events within the input command data; and
the input module calculates the plurality of simulated input events in dependence upon a function of a time difference between a last pair of input events within the input command data.

10. The method according to claim 1, wherein
the input command data relates to input events established by a user of the application;
the plurality of simulated events are projected input events which extend beyond a last input event within the input command data; and
at least one of:
determining whether to dynamically enable the input module is established in dependence upon the input module determining that a vector difference between a last pair of the input events within the input command exceeds a threshold; and
determining whether to dynamically enable the input module is established in dependence upon the input module determining that a time difference between a last pair of the input events within the input command exceeds a threshold.

11. The method according to claim 1, wherein
when enabled the input module process further comprises:
establishing a probability that a drawing activity with respect to the application is occurring;
dynamically throttling the generation and injection of the plurality of simulated input events to reduce a smoothing applied to the plurality of points; wherein
the throttling is established in dependence upon the established probability; and
reducing the smoothing comprises reducing a number of the plurality of intermediate points.

12. The method according to claim 1, wherein
determining whether to dynamically enable the input module is established in dependence upon determining whether the application is required to receive input events at least one of a constant rate and a high rate.

* * * * *